Patented May 10, 1938

2,116,910

UNITED STATES PATENT OFFICE 2,116,910

PLASTER FOR THE PRODUCTION OF SURGICAL CASTS

Jean Piccard, Swarthmore, Pa.

No Drawing. Application April 30, 1935,
Serial No. 19,026

16 Claims. (Cl. 106—24)

This invention relates to plaster and more specifically to plaster for use in the production of surgical casts, such as are employed, for example, in orthopedic surgery and especially in the treatment of bone fractures.

As is well known, it has for many years been customary, after a fracture has been set, to immobilize the affected parts, where possible, by enveloping them in a plaster cast. Ordinarily this cast has been prepared from plaster of Paris, usually by rolling a layer of powdered plaster of Paris into a gauze bandage, wetting the roll, and then unrolling and rerolling the bandage around the fractured part.

It is very desirable to obtain information as to the position of the bone ends soon after the cast has been applied, and also as to the condition of the fracture at intervals during the healing process. To accomplish this purpose it is usual practice to take X-ray photographs of the fracture, necessarily through the plaster cast. Since, however, plaster of Paris possesses only a very limited permeability for X-rays, the photographs obtained by such procedure lack detail and clarity and are far from satisfactory.

Now in accordance with this invention there is provided a plaster suitable for the production of surgical casts which possesses a marked permeability to X-rays and accordingly permits the taking of clear X-ray photographs through casts made therefrom. The casts produced in accordance with this invention are also superior to those heretofore produced in that they are comparatively light in weight and can be worn with greater comfort and less inconvenience.

The plaster in accordance with this invention will comprise essentially a mixture of two or more chemicals, preferably in an anhydrous form, altho water of crystallization may in some instances be present, which will, in the presence of water, undergo a chemical reaction leading to the formation of a new compound or salt which, under the conditions present, will crystallize into a mass of interwoven crystals thus forming a hard rigid plaster. This mixture of compounds will be further characterized in accordance with this invention by the fact that it contains substantially no materials containing an element having an atomic weight greater than that of phosphorus. This will insure a satisfactory permeability to X-rays in the plaster casts produced therefrom as well as comparatively light weight.

Thus, for example, the plaster in accordance with this invention may comprise an anhydrous mixture of a basic compound containing no elements having an atomic weight greater than that of phosphorus, as, for example, the oxides, hydroxides, or carbonates of lithium, sodium, beryllium, aluminum, magnesium, etc. and an acid or acid salt likewise containing no such heavy element, as, for example; organic acids, as benzoic, salicylic, oxalic acids, etc., or salts of ammonia or an alkali metal with an inorganic acid, as phosphoric acid, etc., as diammonium hydrogen phosphate, ammonium dihydrogen phosphate, or other water soluble phosphates, etc.

Upon the addition of small amounts of water to such mixtures a neutralization reaction leading to the formation of a salt takes place, and the crystallization of this salt sets the plaster to a hard, rigid mass. The speed of this reaction and therefore of the setting is dependent upon the particular ingredients chosen, and these will preferably be selected to obtain the desired speed of setting. Thus, in general it will be desirable to use more weakly basic materials, such as the oxides, hydroxides or carbonates of magnesium and aluminum, and relatively weak, organic acids in order to obtain a plaster which does not set too quickly. Even the physical condition of the ingredients may have a noticeable effect on the speed of setting. Thus, for example, a plaster prepared with magnesium oxide (U. S. P., heavy powder) will set much more rapidly than one prepared similarly with that form of magnesium oxide known as "dead burnt magnesite".

Instead of using a basic and an acidic material in the production of the plaster in accordance with this invention, a salt of a weak acid with a metal having an atomic weight not greater than that of phosphorus, as, for example, magnesium acetate, aluminum acetate, etc., and an acidic material of the type described above or another salt, as, for example, ammonium oxalate, etc. may be used. The reaction of setting in such cases will be double decomposition rather than neutralization.

The various ingredients of the plaster in accordance with this invention will preferably be finely powdered and intimately mixed together to insure even and thorough reaction when wet. They will of course be protected from atmospheric moisture until used.

The following examples are illustrative of plasters suitable for practical use in accordance with this invention:

*Example I*

Four parts by weight of very finely powdered aluminum hydroxide and seven parts by weight of powdered salicylic acid are intimately mixed together. The dry powder will keep indefinitely and when moistened with water will slowly harden to a rigid plaster very transparent to X-rays.

*Example II*

One part of powdered magnesium oxide, of the type known as "dead burnt magnesite" is mixed with about three parts of powdered benzoic acid. Casts made with this plaster will harden more rapidly than casts made with the plasters described above.

*Example III*

A valuable plaster in accordance with this invention comprises salicylic acid and magnesium oxide. Plaster casts made from these materials harden still faster than the ones described above and the casts are remarkably light and very strong. Depending on the ratio of salicylic acid and magnesium oxide used a neutral or a basic salicylate can be produced when the plaster sets. A preferred way of making this plaster consists in mixing two parts of salicylic acid with about one part of "dead burnt magnesite." A greater speed of reaction can be produced if part or all of the magnesite is replaced by the more active magnesium oxide, U. S. P., heavy powder.

*Example IV*

Four parts of magnesium carbonate (U. S. P.) are mixed with about five parts of ammonium dihydrogen phosphate. When this powder is mixed with water a slow reaction sets in and a foamy paste is produced with the liberation of carbon dioxide. The paste will finally harden to a solid porous mass which becomes very hard and is considerably lighter than water. If this plaster is used for a plaster cast a very light cast will be obtained which, however, is not quite as transparent to X-rays as the preceding ones.

*Example V*

An excellent plaster may be made by mixing finely powdered diammonium hydrogen phosphate with magnesium oxide. If made with magnesium oxide U. S. P., this plaster sets rather rapidly, and if prepared with dead burnt magnesite it sets too slowly to be convenient. For this reason the use of a mixture of both kinds of magnesium oxide is preferred. By varying the ratio of the two kinds the speed of reaction can be regulated so as to obtain a plaster desirable for the specific purpose for which it is needed. When water is added to this mixture a complicated chemical reaction takes place during which ammonia is set free and insoluble magnesium ammonium phosphate is formed. If, as is the case for surgical use, the formation of much free ammonia is objectionable, its liberation can be reduced to a permissible minimum by addition of a weak acid, as, for example, boric acid.

While here again a wide variety of ratios of ingredients may be used, a preferred product is obtained by intimately mixing ten parts of finely powdered diammonium hydrogen phosphate with about two parts of magnesium oxide U. S. P. heavy powder, one part powdered dead burnt magnesite and three parts powdered boric acid. The plaster made in this manner, when prepared in absence of moisture and kept in a closed vessel, is indefinitely stable.

Casts will be prepared from the plasters in accordance with this invention by any known and usual method for their production. However, because of the solubility of certain of the ingredients it is not advisable to immerse the plaster in water to moisten it, but rather the desired amount of water or only a slight excess should be added to the dry plaster.

It will be understood that the details and examples hereinabove set forth are illustrative only, and not in any way in limitation of the invention as herein described and claimed.

It will be further understood that the plaster in accordance with this invention may be advantageously used for other purposes than in the production of surgical casts, and the description hereinabove with reference to such use is illustrative only.

What I claim and desire to protect by Letters Patent is:

1. A plaster of the character described comprising a substantially dry mixture including an organic acid and a compound selected from the group consisting of magnesium carbonate and the oxides and hydroxides of aluminum and magnesium, said mixture being capable of hardening to a rigid mass through chemical reaction between the ingredients when moistened with water and being characterized by the fact that it is substantially free from any compound containing an element having an atomic weight greater than that of phosphorus.

2. A plaster of the character described comprising a substantially dry mixture including salicylic acid and a compound selected from the group consisting of magnesium carbonate and the oxides and hydroxides of aluminum and magnesium, said mixture being capable of hardening to a rigid mass through chemical reaction between the ingredients when moistened with water and being characterized by the fact that it is substantially free from any compound containing an element having an atomic weight greater than that of phosphorus.

3. A plaster of the character described comprising a substantially dry mixture including a water soluble phosphate and a compound selected from the group consisting of magnesium carbonate and the oxides and hydroxides of aluminum and magnesium, said mixture being capable of hardening to a rigid mass through chemical reaction between the ingredients when moistened with water and being characterized by the fact that it is substantially free from any compound containing an element having an atomic weight greater than that of phosphorus.

4. A plaster of the character described comprising a substantially dry mixture including an ammonium phosphate and a compound selected from the group consisting of magnesium carbonate and the oxides and hydroxides of aluminum and magnesium, said mixture being capable of hardening to a rigid mass through chemical reaction between the ingredients when moistened with water and being characterized by the fact that it is substantially free from any compound containing an element having an atomic weight greater than that of phosphorus.

5. A plaster of the character described comprising a substantially dry mixture including ammonium dihydrogen phosphate and a compound selected from the group consisting of magnesium carbonate and the oxides and hydroxides of aluminum and magnesium, said mixture being capable of hardening to a rigid mass through chemical reaction between the ingredients when moistened with water and being characterized by the fact that it is substantially free from any compound containing an element having an atomic weight greater than that of phosphorus.

6. A plaster of the character described comprising a substantially dry mixture including diammonium hydrogen phosphate and a compound selected from the group consisting of magnesium carbonate and the oxides and hydroxides of aluminum and magnesium, said mixture being capable of hardening to a rigid mass through chemical reaction between the ingredients when moistened with water and being characterized by the fact that it is substantially free from any compound containing an element having an atomic weight greater than that of phosphorus.

7. A plaster of the character described comprising a substantially dry mixture including an acidic compound and a compound selected from the group consisting of the oxides, hydroxides and carbonates of magnesium, said mixture being capable of hardening to a rigid mass through chemical reaction between the ingredients when moistened with water and being characterized by the fact that it is substantially free from any compound containing an element having an atomic weight greater than that of phosphorus.

8. A plaster of the character described comprising a substantially dry mixture including an ammonium phosphate, a compound selected from the group consisting of magnesium carbonate and the oxides and hydroxides of aluminum and magnesium, and a weak acid, said mixture being capable of hardening to a rigid mass through chemical reaction between the ingredients when moistened with water and being characterized by the fact that it is substantially free from any compound containing an element having an atomic weight greater than that of phosphorus.

9. A plaster of the character described comprising a substantially dry mixture including an ammonium phosphate, a compound selected from the group consisting of magnesium carbonate and the oxides and hydroxides of aluminum and magnesium, and boric acid, said mixture being capable of hardening to a rigid mass through chemical reaction between the ingredients when moistened with water and being characterized by the fact that it is substantially free from any compound containing an element having an atomic weight greater than that of phosphorus.

10. A plaster of the character described comprising a substantially dry mixture including salicylic acid and a compound selected from the group consisting of the oxides, hydroxides and carbonates of magnesium, said mixture being capable of hardening to a rigid mass through chemical reaction between the ingredients when moistened with water and being characterized by the fact that it is substantially free from any compound containing an element having an atomic weight greater than that of phosphorus.

11. A plaster of the character described comprising a substantially dry mixture including ammonium dihydrogen phosphate and a compound selected from the group consisting of the oxides, hydroxides and carbonates of magnesium, said mixture being capable of hardening to a rigid mass through chemical reaction between the ingredients when moistened with water and being characterized by the fact that it is substantially free from any compound containing an element having an atomic weight greater than that of phosphorus.

12. A plaster of the character described comprising a substantially dry mixture including diammonium hydrogen phosphate and a compound selected from the group consisting of the oxides, hydroxides and carbonates of magnesium, said mixture being capable of hardening to a rigid mass through chemical reaction between the ingredients when moistened with water and being characterized by the fact that it is substantially free from any compound containing an element having an atomic weight greater than that of phosphorus.

13. A plaster of the character described comprising a substantially dry mixture including salicylic acid and magnesium oxide, said mixture being capable of hardening to a rigid mass through chemical reaction between the ingredients when moistened with water and being characterized by the fact that it is substantially free from any compound containing an element having an atomic weight greater than that of phosphorus.

14. A plaster of the character described comprising a substantially dry mixture including diammonium hydrogen phosphate and magnesium oxide, said mixture being capable of hardening to a rigid mass through chemical reaction between the ingredients when moistened with water and being characterized by the fact that it is substantially free from any compound containing an element having an atomic weight greater than that of phosphorus.

15. A plaster of the character described comprising a substantially dry mixture including diammonium hydrogen phosphate, magnesium oxide, and boric acid, said mixture being capable of hardening to a rigid mass through chemical reaction between the ingredients when moistened with water and being characterized by the fact that it is substantially free from any compound containing an element having an atomic weight greater than that of phosphorus.

16. A plaster of the character described comprising a substantially dry mixture consisting of about 19% magnesium oxide, about 62% diammonium hydrogen phosphate and about 19% boric acid.

JEAN PICCARD.